United States Patent [19]
Ettie et al.

[11] Patent Number: 5,486,102
[45] Date of Patent: Jan. 23, 1996

[54] HIGH INTENSITY PELLET MACHINE

[75] Inventors: Gordon E. Ettie, Minneapolis, Minn.; Donald M. Wilhelm, Novato, Calif.

[73] Assignee: California Pellet Mill Company, San Francisco, Calif.

[21] Appl. No.: 236,066

[22] Filed: May 2, 1994

[51] Int. Cl.$^6$ .................... B29B 7/38; B29B 9/00
[52] U.S. Cl. .................... 425/202; 264/141; 425/207; 425/308; 425/381.2; 425/382 R; 425/382.3
[58] Field of Search .................... 425/308, 309, 425/310, 311, 313, 381, 382.3, 202, 207, 382 R, 382, 381.2; 264/141

[56] References Cited

U.S. PATENT DOCUMENTS

| | | |
|---|---|---|
| 1,650,088 | 11/1927 | Molin . |
| 2,910,726 | 11/1959 | Parshall et al. . |
| 3,301,933 | 1/1967 | Plymale .................... 264/176 |
| 3,303,253 | 2/1967 | Henry .................... 264/176 |
| 3,358,328 | 12/1967 | Kuhn et al. .................... 425/382 |
| 3,511,190 | 5/1970 | Kunz .................... 425/310 |
| 3,841,817 | 10/1974 | Moldenhauer et al. .................... 425/308 |
| 3,846,059 | 11/1974 | Wagner .................... 425/381.2 |
| 4,097,212 | 6/1978 | Morishima et al. .................... 425/313 |
| 4,182,604 | 1/1980 | Wagner .................... 425/237 |
| 4,403,936 | 9/1983 | Heesen .................... 425/382 R |
| 4,770,625 | 9/1988 | Appelgren et al. .................... 425/331 |
| 5,009,586 | 4/1991 | Pallmann .................... 425/311 |

*Primary Examiner*—Khanh P. Nguyen
*Attorney, Agent, or Firm*—Robert F. Palermo; Michael H. Minns

[57] ABSTRACT

A pellet mill for pelleting feed product, has a pelleting die with a plurality of extrusion holes for extruding the feed product; rollers, rotatable relative to the pelleting die, for forcing feed product through the extrusion holes; provision for intensively mixing and shearing the feed product before introducing the feed product to the pelleting die; and a device for positively conveying the feed product into the provision for intensively mixing and shearing.

14 Claims, 2 Drawing Sheets

HIGH INTENSITY PELLET MACHINE

BACKGROUND OF THE INVENTION

This invention relates generally to pelletizing machinery and more particularly to a pellet machine which is tolerant of variability in properties of the feed product and which subjects the feed product to intensive mechanical shearing action prior to pellet formation in the extrusion die.

The standard pelleting process in animal feed pellet production and other similar applications achieves a combination of heating and moisturizing the feed product, performing mechanical work on the feed product, and densification and shaping of the feed product to produce pellets. Heating and moisturizing the feed product is required for sterilization (usually to destroy salmonella organisms), for causing a desired degree of starch conversion, and for softening the feed product to a sufficient degree for forming durable pellets without danger of plugging the pellet die. It is generally accomplished by injecting steam into the feed product within a conditioning chamber and holding the mixture until the heat and moisture from the condensing steam is absorbed into the feed product. The feed product is usually ground before it is exposed to the heat and moisture in the conditioning chamber.

In a pellet mill of standard configuration, mechanical work is performed on the feed product by the pinching action of a roller passing over a die face. Some shear of the product also results from the rolling action; but, because of the fluid characteristic of the feed product and frictional drag in the die holes, even more shear occurs in the die holes between the centers and the outer surfaces of the pellets.

Densification occurs as a result of the pressure required to force the feed product through the die holes. The only force available to achieve this extrusion is that developed by the material being pinched between the roller and the die face, and it is limited by the fluid flow characteristics of the feed product. If the force required to push the feed product through the die holes exceeds the pressure that can be generated in the feed product by the pinching action, flow through the die holes halts and the pelleting operation ceases. This force limitation imposes upper limits on moisture content and fat content of the formulation of the feed product.

In some applications, the process is improved if higher temperatures together with greater levels of mechanical shear and pressure are applied to the feed product. Several non-standard pelleting concepts have been developed to attain these higher levels of temperature, mechanical shear, and pressure. These include Thick Pad Pelleting, Double Pelleting, Pre-Treatment of Feed Product in an Expander before pelleting.

Thick Pad Pelleting provides an increased gap between the roller(s) and die, when the feed product characteristics permit, to form a thicker layer of feed product and cause increased slip (differential peripheral speeds) between the die and roller surfaces. This slip translates into additional shear taking place in the thicker pad of feed product on the face of the die. This approach fails in cases where the feed product material loses the ability to generate adequate pelleting pressures due to the thicker pad on the die, i.e., the feed product squeezes laterally out from between the roller(s) and the die rather than extruding through the die. High cereal grain feed mixtures generally cannot be processed with Thick Pad Pelleting.

Double Pelleting is a process whereby two pellet mills are connected together such that pellets emerging from the first mill feed directly into the second mill without any intermediate operation or cooling. This allows additional work to be done on the product without having to change the characteristics of the pellet mills. The Double Pelleting process is reliable and easy to operate, but it still has an upper limit as to the intensity of mechanical shear which it can impart to the feed product.

Pretreatment of the Feed Product in an Expander before pelleting can achieve high intensity shearing as part of the conditioning process or as an extension of that process. In this operation, an expander is a screw conveyor operating ahead of a standard pellet mill and consisting of paddles rotating between interrupter bars. The paddles force the feed product past the interrupter bars against a back pressure created by a restrictor plate or discharge cone at the end of the screw assembly, thereby subjecting the product to shear forces. As an option, steam and water can be injected into the housing, if needed. The expander can achieve high intensity shear and elevated pressures which produce a higher temperature than be achieved at atmospheric pressure. However, treatment in an expander has its limitations, viz. inefficiency, difficult product to pelletize, and sensitivity to the properties of the feed product. There are a series of large void volumes in the expander separated by the paddles and interrupter bars. The intense shearing only takes place at the interface between the paddles, bars, and feed product. In the void volumes the product is only mulled by low level compressive forces which consumes energy, increases temperature of feed product, and produces little shear. If needed, the temperature rise produced by the wasted work in the expander could be produced more efficiently by additional steam injection. Treated product is discharged from the expander in the form of chunks which create erratic die loading in the subsequent pelleting process. Also, operating characteristics of the expander are sensitive to the properties of the feed product. For example, if the feed product becomes too dry, extreme pressures leading to component failure or stall may develop in the expander. On the other hand, feed products containing excessive moisture easily become fluidized and create no back pressure. Thus, except in those rare cases where the feed product is very uniform, the expander is not reliably practical.

The foregoing illustrates limitations known to exist in present high shear pelleting machines. It would be advantageous to provide an alternative directed to overcoming one or more of those limitations. Accordingly, a suitable alternative is provided including features more fully disclosed hereinafter.

SUMMARY OF THE INVENTION

In one aspect of the present invention, a pellet mill for pelleting feed product, comprises a pelleting die having a plurality of extrusion holes for extruding the feed product; roller means, rotatable relative to the pelleting die, for forcing feed product through the extrusion holes; means for intensively mixing and shearing the feed product before introducing the feed product to the pelleting die; and means for positively conveying the feed product into the means for intensively mixing and shearing.

The foregoing and other aspects will become apparent from the following detailed description of the invention when considered in conjunction with the accompanying drawings.

DETAILED DESCRIPTION

Figure 1:
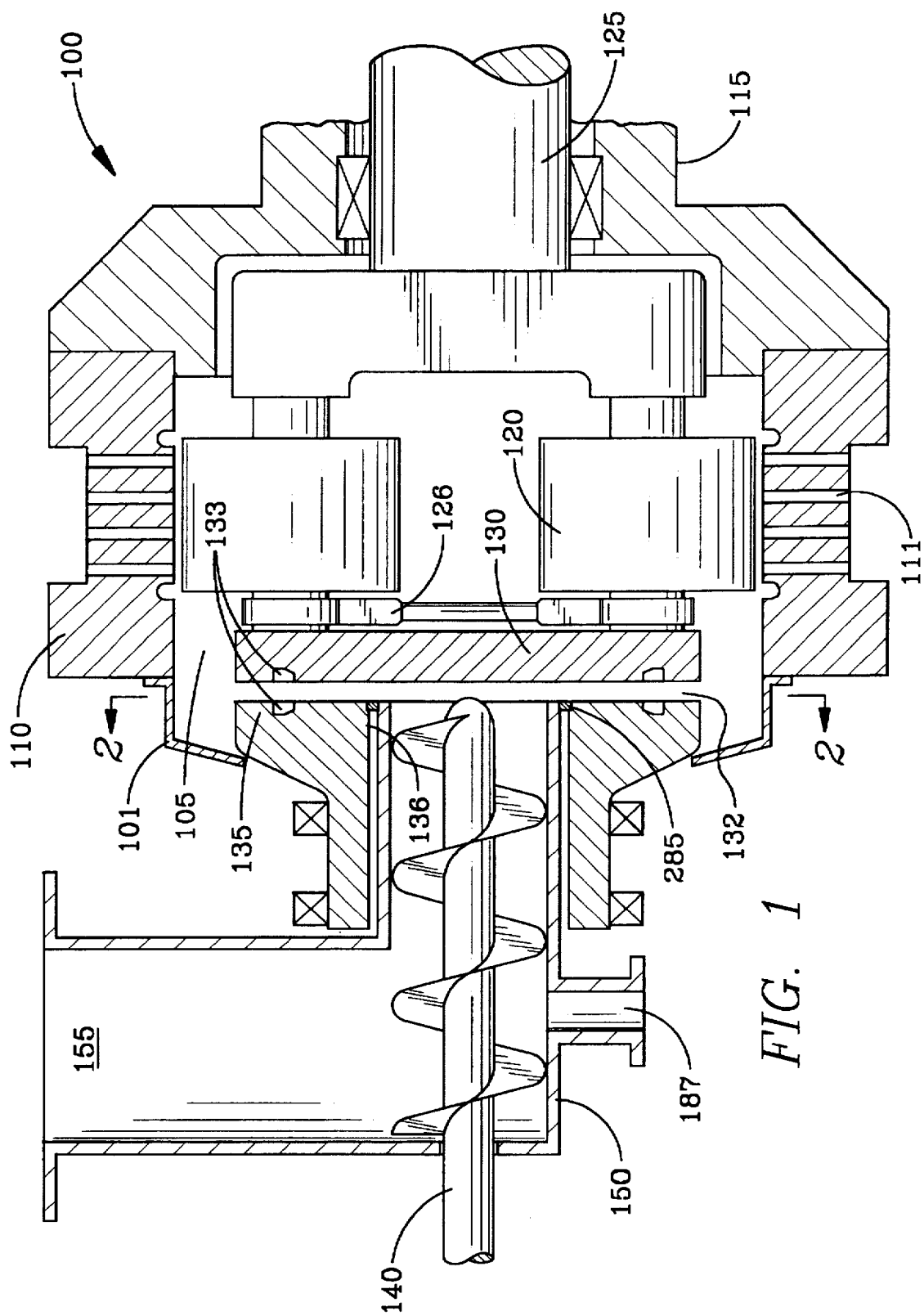
FIG. 1 is a fragmentary schematic partially sectional elevational view illustrating an embodiment of the high intensity pellet machine of the present invention.

Except for the addition of the high intensity shear and mixing device, the pellet machine of FIG. 1 is standard in every way. That is, pellet machine 100, in the area of significance for purposes of discussion of the invention, consists of a pelleting die 110 having a number of extrusion holes 111 and mounted upon quill shaft 115. Rollers 120 are mounted on main shaft 125 and are in contact with die 110 so that there is relative rotational motion between the die and rollers and any feed product that is between them will be forced through extrusion holes 111. All provisions for roller adjustment and other operating parameters and conditions are standard. In most cases, main shaft 125 is stationary, and quill shaft 115 rotates. However, there may be some applications in which the converse arrangement is desirable or necessary. In some rare cases, both shafts may be counterrotated simultaneously.

The high intensity shear and mixing device is made up of a solid circular disc 130 which is mounted on the front of the front roller support plate 126 and which covers all but a small annular gap 105 of the front opening of pelleting die 110. Immediately in front of the disc 130, and separated therefrom by a narrow adjustable gap 132, an annular shear plate 135 is rotatably mounted around a stationary feeder housing 150. The housing 150 has a top inlet 155 for receiving feed product and a screw feeder 140 for driving the feed product against the face of disc 130 and radially outward into gap 132. A dynamic seal 285 is provided between housing 150 and the inner edge 136 of annular disc 135 to prevent escape of feed product through that interface. An additional seal (not shown) may be provided if it is found to be needed between feed cone 101 and the outer edge of disc 135. Disc 135 may be driven by the same drive as feed screw 140, by a separate drive of its own, or by die 110 through a drive interface between the disc and the die. The drive mechanisms connecting disc 135 to the feed screw drive, a separate drive or to die 110 are not shown in the FIGURES.

Generally, feed product is preconditioned with heat and moisture (as by steam), and any required additives are introduced prior to entry of the feed product into inlet 155 of the feeder. In case additional heat and moisture (or other fluid additive) is needed an injector nozzle 187 is provided for injection into housing 150 adjacent to feed screw 140.

Figure 2:
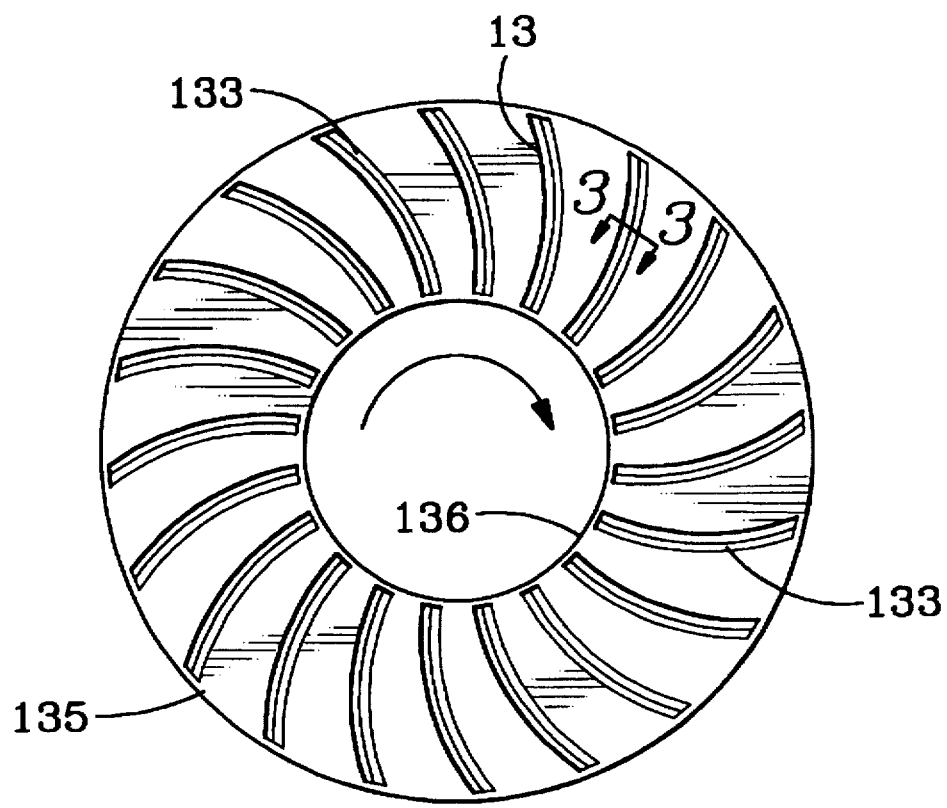
FIG. 2 is an elevation view seen from line 2—2 of FIG. 1.
Figure 3:
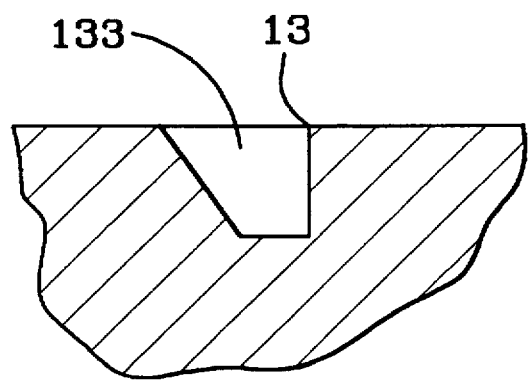
FIG. 3 is a fragmentary sectional view seen from line 3—3 of FIG. 2.

Solid disc 130 and annular disc 135 have substantially radial spirally configured grooves 133 on their proximal faces as seen in FIG. 2 and FIG. 3. The grooves 133 are oriented so that their outer ends lag the inner ends as the discs 135 and 130 rotate relatively to each other. This drives the feed product outward to the periphery of the discs by the action of the spiral grooves. At the same time cutting edges 13 of grooves 133, seen in FIG. 3, contribute cutting action on the feed product as it travels outwardly under the driving influence of the spiral groove shape. The combined action of grooves 133 and cutting edges 13 provides the intensive cutting and plastic shearing of the feed product desired for homogeneous pelleting strength and overall quality. The feed product is diverted from the periphery of the discs directly into the die face. This direct flow path improves the performance of the pellet mill by providing a uniform feed around the die 110. Efficiency of the pellet mill is improved due to the direct action between the discs, in which pressure and shear are controlled by the gap 132 between the discs, and in which the gap can be increased to reduce loading if the feed becomes too dry or vice versa. The pumping action of grooves 133 assures the feed product will be discharged from gap 132 at the periphery of discs 130, 135; because there are no large voids where feed product collects within this invention. Thus, there is no wasted energy and pelleting is accomplished at high efficiency.

If necessary, discs 130 and 135 can be driven in opposite directions by the main shaft 125 and the quill shaft 115; by the mainshaft 125 and a separate annular disc 135 drive; and by the mainshaft 125 and the drive for the feed screw 140. The counterrotation of the discs will increase the relative motion between them and will therefore increase the intensity of the shearing action.

By arranging the shape of the grooves and of the cutting edges thereof and the spacing of the grooves, it is possible for the pellet mill to perform less shear and more cutting of the feed product. In this embodiment, the system would pregrind the feed product prior to pelleting and would extend the life of the pellet mill die and improve quality of the pellets produced in alfalfa and wood pelleting. In another embodiment, the disc surfaces would have many small protrusions so that a grinding action would result. Of course this would drastically reduce the number of spiral grooves 133 in the discs, but it would not retard the radially outward feed of the feed product which will be finely ground by the action of such small protrusions. Other textures used in disc refiners applied to corn milling and wood pulping could be applied.

The disc assembly could also provide a pressure seal for the discharge of a pressurized conditioner ahead of the pellet mill. This would permit the conditioner to operate with internal steam pressurization and would aid sterilization of the feed product by sustaining higher conditioning temperatures.

What is claimed is:

1. A pellet mill for pelleting feed product, comprising:

a pelleting die having a plurality of extrusion holes for extruding said feed product;

roller means, rotatable relative to the pelleting die, for forcing feed product through said extrusion holes;

means for mixing and shearing the feed product before introducing said feed product to said pelleting die, the means for mixing and shearing the feed product comprising a solid round disc occluding all but a narrow annular region adjacent to the pelleting die; an annular disc, facing said solid round disc and spaced therefrom by a narrow adjustable gap, and having an open center through which feed product is introduced; and substantially radial grooves arrayed about the proximal faces of said discs, at least one of said discs being rotatable; and means for positively conveying the feed product into said means for mixing and shearing.

2. The pellet mill of claim 1, wherein the substantially radial grooves comprise spiral grooves having inboard ends and outboard ends whose outboard ends are offset a predetermined distance in a counter clockwise direction from the inboard ends.

3. The pellet mill of claim 1, wherein the means for positively conveying the feed product into said means for mixing and shearing comprises a screw conveyor in a housing, said housing having an outlet which makes a dynamic seal with the open center of said rotatable annular disc so that feed product from the screw conveyor must pass between the proximal grooved faces of the round disc and the annular disc.

4. A pellet mill for pelleting feed product, comprising:

a pelleting die having a plurality of extrusion holes for extruding said feed product;

roller means, rotatable relative to the pelleting die, for forcing feed product to said extrusion holes;

means for mixing and shearing the feed product before introducing said feed product to said pelleting die, the means for mixing and shearing the feed product comprising a stationary round disc occluding all but a narrow annular region adjacent to the pelleting die; a rotatable annular disc, facing said stationary round disc and spaced therefrom by a narrow adjustable gap, and having an open center through which feed product is introduced; and substantially radial grooves arrayed about the proximal faces of said discs; and means for positively conveying the feed product into said means for mixing and shearing.

5. The pellet mill of claim 1, wherein one edge of each groove is offset a predetermined distance in a counter clockwise direction from the other edge, said offset edge forming a sharp cutting edge.

6. The pellet mill of claim 1, wherein the annular disc is rotatable.

7. The pellet mill of claim 1, wherein the solid round disc is rotatable.

8. The pellet mill of claim 1, wherein the annular disc is rotatable in a first direction and the solid round disc is rotatable in a second direction, the second direction being opposite the first direction.

9. The pellet mill of claim 4, wherein the substantially radial grooves comprise spiral grooves whose outboard ends are offset a predetermined distance in a counter clockwise direction from the inboard ends.

10. The pellet mill of claim 4, wherein one edge of each groove is offset a predetermined distances in a counter clockwise direction from the other edge, said offset edge forming a sharp cutting edge.

11. A pellet mill for pelleting feed product, comprising:

a pelleting die having a plurality of extrusion holes for extruding said feed product;

roller means, rotatable relative to the pelleting die, for forcing feed product through said extrusion holes;

means for mixing and plastically shearing the feed product before introducing said feed product to said pelleting die, the means for mixing and plastically shearing the feed product comprising a solid round disc occluding all but a narrow annular region adjacent to the pelleting die; an annular disc coaxial to and facing the solid round disc and spaced therefrom by a narrow adjustable gap, and having an open center through which feed product is introduced; and spiral grooves arrayed about the proximal faces of the discs, the outboard ends of the spiral grooves being offset a predetermined distance in a counter clockwise direction from the inboard ends of the spiral grooves; and means for positively conveying the feed product into said means for mixing and shearing.

12. The pellet mill of claim 11, wherein the annular disc is rotatable.

13. The pellet mill of claim 11, wherein the solid disc is rotatable.

14. The pellet mill of claim 11, wherein the annular disc is rotatable in a first direction and the solid round disc is rotatable in a second direction, the second direction being opposite the first direction.

* * * * *